United States Patent
Kim et al.

(10) Patent No.: US 10,848,206 B2
(45) Date of Patent: Nov. 24, 2020

(54) REFERENCE SIGNAL TRANSMISSION METHOD IN MULTI-ANTENNA WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Kijun Kim, Seoul (KR); Jiwon Kang, Seoul (KR); Jonghyun Park, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/510,741

(22) PCT Filed: Sep. 25, 2015

(86) PCT No.: PCT/KR2015/010180
§ 371 (c)(1),
(2) Date: Mar. 13, 2017

(87) PCT Pub. No.: WO2016/048087
PCT Pub. Date: Mar. 31, 2016

(65) Prior Publication Data
US 2017/0279501 A1   Sep. 28, 2017

Related U.S. Application Data

(60) Provisional application No. 62/055,625, filed on Sep. 25, 2014.

(51) Int. Cl.
*H04B 7/0413* (2017.01)
*H04B 7/0456* (2017.01)
(Continued)

(52) U.S. Cl.
CPC ......... *H04B 7/0413* (2013.01); *H04B 7/0469* (2013.01); *H04B 7/06* (2013.01);
(Continued)

(58) Field of Classification Search
None
See application file for complete search history.

(56) References Cited

U.S. PATENT DOCUMENTS 4,937,585 A * 6/1990 Shoemaker .............. H01Q 3/36
343/700 MS
6,661,374 B2 * 12/2003 Kim ........................ H01Q 3/24
342/368

(Continued)

FOREIGN PATENT DOCUMENTS

EP         2894801 A1 *  7/2015 ........... H04B 7/0469
WO    WO-2013100565 A1 *  7/2013

OTHER PUBLICATIONS

Samsung, "Remaining Issues on CSI-RS Transmission," 3GPP TSG RAN WG1 #62bis, R1-105377, Xi'an, China, Oct. 11-15, 2010, 4 pages.

(Continued)

*Primary Examiner* — Parth Patel
*Assistant Examiner* — Berhanu D Belete
(74) *Attorney, Agent, or Firm* — Birch, Stewart, Kolasch & Birch, LLP

(57) ABSTRACT

The present invention relates to a base station in a wireless communication system which supports multi-antennas with multiple horizontal domains and multiple vertical domains. Particularly, the present invention comprises: a radio frequency unit and a processor, wherein the radio frequency unit comprises a first radio frequency (RF) chain and a second radio frequency (RF) chain which are connected to antenna elements corresponding to multiple vertical anten- (Continued)

nas with specific horizontal domains, wherein the processor, connected to the radio frequency unit, is configured to transmit reference signals, and wherein the first RF chain and the second RF chain are configured for different reference signals.

1 Claim, 10 Drawing Sheets

(51) Int. Cl.
*H04L 5/00* (2006.01)
*H04B 7/06* (2006.01)
*H04W 4/18* (2009.01)

(52) U.S. Cl.
CPC ............ *H04L 5/0005* (2013.01); *H04L 5/005* (2013.01); *H04L 5/0023* (2013.01); *H04L 5/0035* (2013.01); *H04L 5/0073* (2013.01); *H04W 4/18* (2013.01)

(56) References Cited

U.S. PATENT DOCUMENTS

| | | | | |
|---|---|---|---|---|
| 7,450,066 B2* | 11/2008 | Haskell | ........... | H01Q 1/246 342/368 |
| 2002/0053995 A1* | 5/2002 | Kim | ........... | H01Q 3/38 343/853 |
| 2006/0208944 A1* | 9/2006 | Haskell | ........... | H01Q 1/246 342/368 |
| 2009/0224990 A1* | 9/2009 | Cezanne | ........... | H04B 7/10 343/726 |
| 2009/0227260 A1* | 9/2009 | Anreddy | ........... | H04B 7/0452 455/450 |
| 2010/0069028 A1* | 3/2010 | Choi | ........... | H04B 7/0602 455/136 |
| 2011/0194551 A1* | 8/2011 | Lee | ........... | H04B 7/0626 370/342 |
| 2012/0127878 A1* | 5/2012 | Kim | ........... | H04B 7/0608 370/252 |
| 2012/0134334 A1* | 5/2012 | Ko | ........... | H04B 7/0413 370/329 |
| 2012/0155561 A1* | 6/2012 | Seo | ........... | H04B 7/024 375/260 |
| 2012/0213111 A1* | 8/2012 | Shimezawa | ........... | H04B 7/063 370/252 |
| 2012/0287875 A1* | 11/2012 | Kim | ........... | H04W 76/27 370/329 |
| 2012/0320819 A1* | 12/2012 | Kim | ........... | H04L 25/03343 370/315 |
| 2013/0039203 A1* | 2/2013 | Fong | ........... | H04B 7/024 370/252 |
| 2013/0044650 A1* | 2/2013 | Barker | ........... | H04B 7/0469 370/278 |
| 2013/0070719 A1* | 3/2013 | Xu | ........... | H04L 5/005 370/329 |
| 2013/0128860 A1* | 5/2013 | Zhang | ........... | H04W 72/04 370/330 |
| 2013/0155847 A1* | 6/2013 | Li | ........... | H04W 76/10 370/225 |
| 2013/0156001 A1* | 6/2013 | Gomadam | ........... | H04B 7/0626 370/330 |
| 2013/0234890 A1* | 9/2013 | Chethik | ........... | H01Q 3/36 342/374 |
| 2013/0272263 A1* | 10/2013 | Pi | ........... | H04B 7/0626 370/330 |
| 2013/0314280 A1* | 11/2013 | Maltsev | ........... | H01Q 3/34 342/368 |
| 2013/0329772 A1* | 12/2013 | Wernersson | ........... | H04B 7/0469 375/219 |
| 2013/0343303 A1* | 12/2013 | Kim | ........... | H04B 7/0452 370/329 |
| 2014/0016497 A1* | 1/2014 | Seo | ........... | H04W 72/1268 370/252 |
| 2014/0018115 A1* | 1/2014 | Zhuang | ........... | H04B 7/024 455/501 |
| 2014/0070996 A1* | 3/2014 | Kneckt | ........... | G01S 1/08 342/386 |
| 2014/0177744 A1* | 6/2014 | Krishnamurthy | .... | H04B 7/0469 375/267 |
| 2014/0198871 A1* | 7/2014 | Ko | ........... | H04W 72/085 375/267 |
| 2014/0286182 A1* | 9/2014 | Chen | ........... | H04L 5/0023 370/252 |
| 2014/0334566 A1* | 11/2014 | Kim | ........... | H04B 7/0469 375/267 |
| 2015/0103745 A1* | 4/2015 | Negus | ........... | H04B 15/00 370/328 |
| 2015/0124688 A1* | 5/2015 | Xu | ........... | H04B 7/0452 370/312 |
| 2015/0180628 A1* | 6/2015 | Kim | ........... | H04B 7/0667 370/336 |
| 2015/0222340 A1* | 8/2015 | Nagata | ........... | H04W 16/28 375/267 |
| 2015/0289147 A1* | 10/2015 | Lou | ........... | H04B 7/0408 370/329 |
| 2015/0311962 A1* | 10/2015 | Maltsev | ........... | H04B 7/0669 375/267 |
| 2015/0382205 A1* | 12/2015 | Lee | ........... | H04W 52/365 370/329 |
| 2015/0382214 A1* | 12/2015 | Cheng | ........... | H04W 48/16 370/252 |
| 2016/0037560 A1* | 2/2016 | Liu | ........... | H04L 51/28 370/329 |
| 2016/0119947 A1* | 4/2016 | Park | ........... | H04B 7/024 370/329 |
| 2016/0261326 A1* | 9/2016 | Barker | ........... | H01Q 3/2605 |
| 2018/0041936 A1* | 2/2018 | Kim | ........... | H04W 4/70 |

OTHER PUBLICATIONS

ZTE, "Consideration on 3D channel model and evaluation methodology," 3GPP TSG RAN WG1 Meeting #72, R1-130693, St Julian's, Malta, Jan. 28-Feb. 1, 2013, 5 pages.

* cited by examiner (a)

(b)

(a)

(b)

: RF chain for DMRS        : RF chain for both CSI - RS and CRS

: Phase shifter           : Antenna element (a)

(b)

(c)

(a)

(b)

(c)

REFERENCE SIGNAL TRANSMISSION METHOD IN MULTI-ANTENNA WIRELESS COMMUNICATION SYSTEM, AND APPARATUS THEREFOR

CROSS-REFERENCE TO RELATED APPLICATIONS

This application is the National Phase of PCT International Application No. PCT/KR2015/010180, filed on Sep. 25, 2015, which claims priority under 35 U.S.C. 119(e) to U.S. Provisional Application No. 62/055,625, filed on Sep. 25, 2014, all of which are hereby expressly incorporated by reference into the present application.

BACKGROUND OF THE INVENTION

Field of the Invention

The present invention relates to a wireless communication system, and more particularly, to a method of transmitting a reference signal in a wireless communication system supporting multiple antennas and an apparatus therefor.

Discussion of the Related Art

MIMO (multi-input multi-output) technology means a method of improving data transceiving efficiency by adopting multiple transmitting antennas and multiple receiving antennas instead of a single transmitting antenna and a single receiving antenna. In particular, this technology increases capacity or enhances performance using multiple antennas in a transmitting or receiving end of a wireless communication system. This MIMO technology may be called multi-antenna technology.

In order to support MIMO transmission, it may be able to use a precoding matrix to appropriately distribute transmission information to each antenna in accordance with a channel status and the like. In the conventional 3GPP ($3^{rd}$ generation partnership project) LTE (long term evolution) system, maximum 4 transmitting antennas are supported for downlink transmission and a corresponding precoding codebook is defined.

In a multi-antenna system-based cellular communication environment, data transfer rate can be enhanced via beamforming between a transmitting end and a receiving end. Whether to apply a beamforming scheme is managed based on channel information. In general, it may be able to use a scheme that a receiving end appropriately quantizes a channel estimated by a reference signal and the like using a codebook and gives a transmitting end feedback on the quantized channel.

In the following, a spatial channel matrix (simply, channel matrix) capable of being used for generating a codebook is briefly explained. The spatial channel matrix (or, channel matrix) can be represented as follows.

$$H(i,k) = \begin{bmatrix} h_{1,1}(i,k) & h_{1,2}(i,k) & \ldots & h_{1,Nt}(i,k) \\ h_{1,2}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

In this case, H (i, k) corresponds to a spatial channel matrix, Nr corresponds to the number of reception antennas, Nt corresponds to the number of transmission antennas, r corresponds to an index of a reception antenna, t corresponds to an index of a transmission antenna, i corresponds to an index of an OFDM (or SC-FDMA) symbol, and k corresponds to an index of a subcarrier.

$h_{r,t}(i,k)$ corresponds to an element of a channel matrix H(i, k) indicating a state of an $r^{th}$ channel and a $t^{th}$ antenna on an $i^{th}$ symbol and $k^{th}$ subcarrier.

A spatial channel covariance matrix capable of being used in the present invention is briefly explained in the following. The spatial channel covariance matrix can be represented by such a sign as R. In particular, the spatial channel covariance matrix can be represented as $R = E[H_{i,k}^H H_{i,k}]$. In this case, H and R correspond to a spatial channel matrix and a spatial channel covariance matrix, respectively. E[ ] corresponds to a mean, i corresponds to a symbol index, and k corresponds to a frequency index.

SVD (singular value decomposition) is one of important methods for decomposing a rectangular matrix. The SCD is widely used in signal processing and statistics. The SVD generalizes a spectrum theory of a matrix in response to a random rectangular matrix. An orthogonal square matrix can be decomposed to a diagonal matrix using the spectrum theory based on an Eigen value. Assume that a channel matrix H corresponds to m×n matrix consisting of a set element of real numbers or complex numbers. In this case, the matrix H can be represented by multiplication of three matrixes described in the following.

$$H_{m \times n} = U_{m \times m} \Sigma_{m \times n} V_{n \times n}^H$$

In this case, U and V correspond to unitary matrixes and $\Sigma$ corresponds to m×n diagonal matrix including a singular value which is not a negative value. The singular value corresponds to $\Sigma = \mathrm{diag}(\sigma_1 \ldots \sigma_r), \sigma_i = \sqrt{\lambda_i}$. As mentioned above, when a matrix is represented by multiplication of three matrixes, it is referred to as singular value decomposition. It may be able to handle a much more general matrix using the singular value decomposition compared to Eigen value decomposition capable of decomposing an orthogonal square matrix only. The singular value decomposition and the Eigen value decomposition are related to each other.

When a matrix H corresponds to a Hermite matrix which is positive definite, all Eigen values of the H correspond to real numbers which are not negative numbers. In this case, a singular value and a singular vector of the H correspond to real numbers which are not negative numbers. In particular, the singular value and the singular vector of the H become identical to the Eigen value and the Eigen vector of the H. Meanwhile, EVD (Eigen value Decomposition) can be represented as follows (in this case, Eigen value may correspond to $\lambda 1, \ldots, \lambda r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

In this case, Eigen value may correspond to $\lambda 1, \ldots, \lambda r$. When singular value decomposition is performed on $HH^H$, it is able to know information on U among U and V that indicate channel direction. When singular value decomposition is performed on $H^H H$, it is able to know information on V. In general, each of a transmitting end and a receiving end performs beamforming to achieve a higher transfer rate in MU-MIMO (multi user-MIMO). If a beam of the receiving end and a beam of the transmitting end are represented by a matrix T and a matrix W, respectively, a channel to which beamforming is applied can be represented as $THW = TU(\Sigma)VW$. Hence, it may be preferable to generate a reception beam on the basis of the U and generate a transmission beam on the basis of the V to achieve a higher transfer rate.

In general, main concern in designing a codebook is to reduce feedback overhead using the number of bits as small as possible and precisely quantify a channel to achieve sufficient beamforming gain. One of schemes of designing a codebook, which is proposed or selected by recent communication standard such as 3GPP LTE (3rd Generation Partnership Project Long Term Evolution), LTE-Advanced, IEEE 16m system, etc. corresponding to an example of a mobile communication system, is to transform a codebook using a long-term covariance matrix of a channel as shown in equation 1 in the following.

$$W'=\text{norm}(RW) \quad \text{[Equation 1]}$$

In this case, W corresponds to a legacy codebook for reflecting short-term channel information, R corresponds to a long-term covariance matrix of a channel H, and norm (A) corresponds to a normalized matrix that norm is normalized by 1 according to each column of a matrix A. W' corresponds to a final codebook transformed from the legacy codebook W using the channel matrix H, the long-term covariance matrix R of the channel matrix H and a norm function.

The R, which is the long-term covariance matrix of the channel matrix H, can be represented as equation 2 in the following.

$$R = E[H^H H] = V\Lambda V^H = \sum_{i=1}^{Nt} \sigma_i v_i v_i^H \quad \text{[Equation 2]}$$

In this case, if the singular value decomposition is performed on the R, which is the long-term covariance matrix of the channel matrix H, the R is decomposed to $V\Lambda V^H$. V corresponds to Nt×Nt unitary matrix and has Vi as an $i^{th}$ column vector. $\Lambda$ corresponds to a diagonal matrix and has $\sigma_i$ as an $i^{th}$ diagonal component. $V^H$ corresponds to an Hermitian matrix of the V. And, $\sigma_i$, $V_i$ respectively correspond to an $i^{th}$ singular value and an $i^{th}$ singular column vector corresponding to the $i^{th}$ singular value ($\sigma_1 \geq \sigma_2 \geq \ldots \geq \sigma_{Nt}$).

SUMMARY OF THE INVENTION

A technical task of the present invention is to provide a method of transmitting a reference signal in a multi-antenna wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

To achieve these and other advantages and in accordance with the purpose of the present invention, as embodied and broadly described, according to one embodiment, a base station in a wireless communication system supporting multiple antennas having a plurality of horizontal domains and a plurality of vertical domains includes an RF (radio frequency) unit and a processor. In this case, the RF unit includes a first RF chain and a second RF chain which are connected with antenna elements corresponding to a plurality of vertical antennas having a specific horizontal domain, the processor connected with the RF unit is configured to transmit reference signals, and the first RF chain and the second RF chain are configured for reference signals different from each other.

Preferably, the first RF chain is configured to be used for a DMRS (de-modulation reference signal) port and the second RF chain is configured to be used for at least one of a CSI RS (channel state information-reference signal) port and a CRS (cell-specific reference signal) port.

Preferably, a CSI-RS and a CRS are configured to be transmitted using a different time resource.

Preferably, the RF unit further includes a third RF chain, the first RF chain is configured to be used for a DMRS (de-modulation reference signal) port, the second RF chain is configured to be used for a CSI RS (channel state information-reference signal) port, and the third RF chain is configured to be used for a CRS (cell-specific reference signal) port.

Preferably, the RF unit is associated with the first RF chain, associated with a plurality of first phase shifters respectively corresponding to a plurality of the antenna elements and the second RF chain, and configured to contain a plurality of second phase shifters respectively corresponding to a plurality of the antenna elements.

To further achieve these and other advantages and in accordance with the purpose of the present invention, according to a different embodiment, a method of transmitting a reference signal, which is transmitted by a base station in a wireless communication system supporting multiple antennas having a plurality of horizontal domains and a plurality of vertical domains, includes the steps of signaling a CSI-RS (channel state information-reference signal) configuration that indicates whether to apply CDM (code division multiplexing), mapping a CSI-RS (channel state information-reference signal) sequence to REs (resource elements) based on an antenna port, and if the CSI-RS configuration indicates not to apply the CDM, transmitting a channel state information-reference signal of which TDM (time division multiplexing) and FDM (frequency division multiplexing) are applied to the mapped resource element to a user equipment.

Advantageous Effects

According to embodiments of the present invention, it is able to efficiently provide a method of transmitting a reference signal in a multi-antenna wireless communication system.

It will be appreciated by persons skilled in the art that that the effects achieved by the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
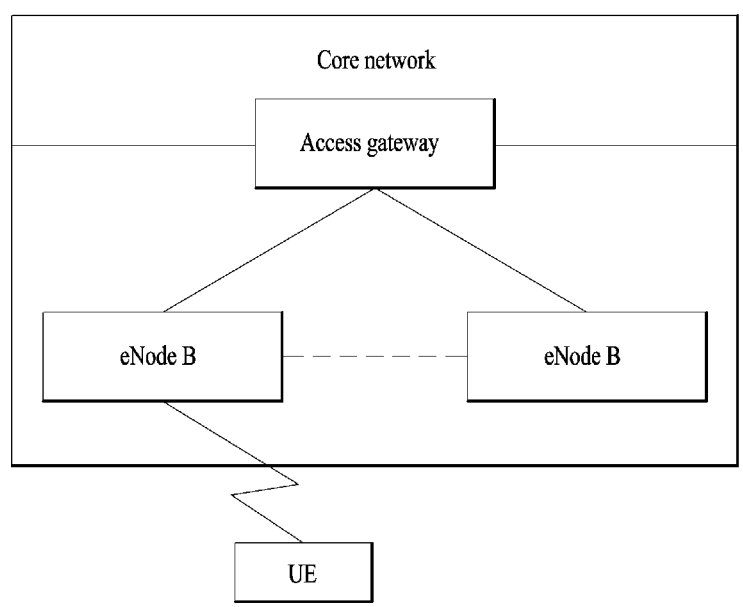
FIG. 1 is a diagram showing a network structure of an Evolved Universal Mobile Telecommunications System (E-UMTS) as an example of a mobile communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
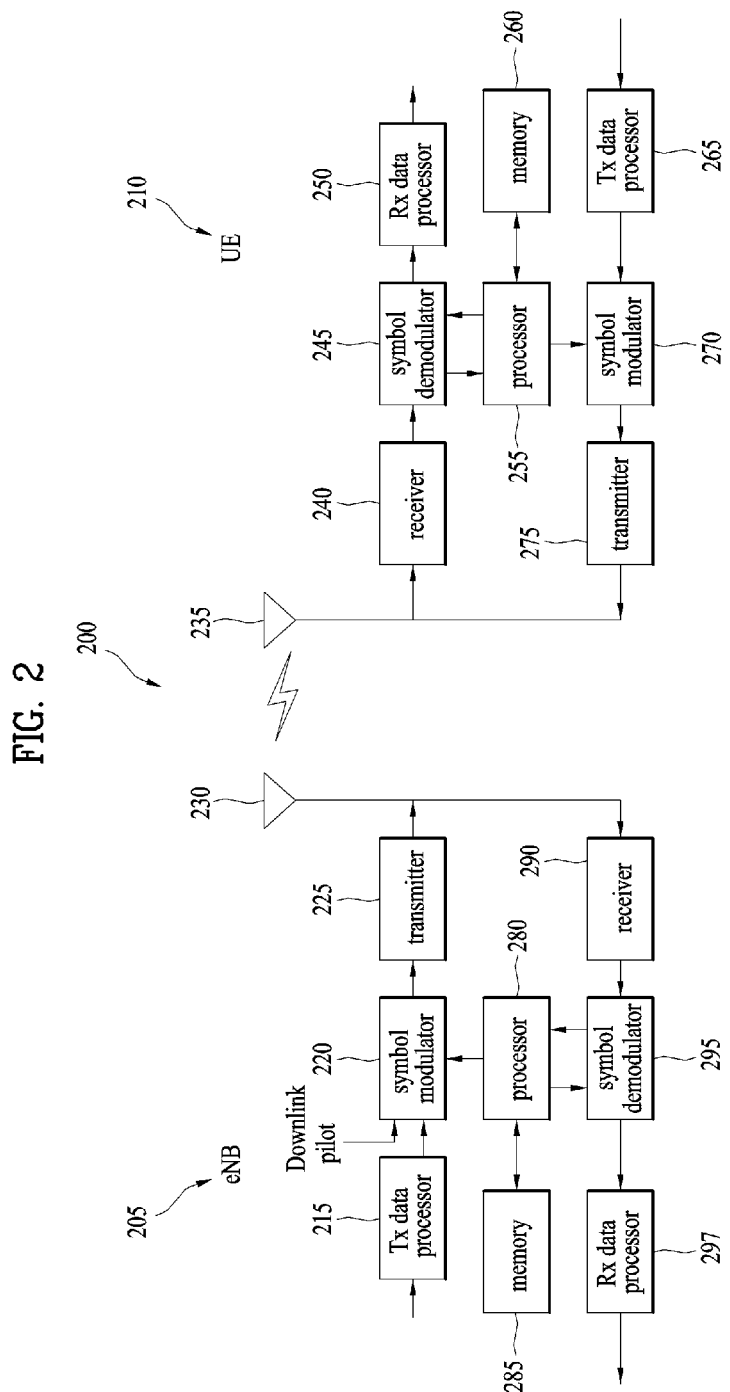
FIG. 2 is a block diagram illustrating configurations of a base station and a user equipment in a wireless communication system according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 205 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

Moreover, although it is not depicted in FIG. 2, an RF chain corresponds to a part of which a filter and a power amp are combined in an antenna. Specifically, the RF chain can include an RF transmission chain and an RF reception chain. The RF transmission chain includes a DAC (digital-to-analog converter), a mixer for frequency up converting, a PA (power amplifier), a duplexer, and a diplexer. The DAC converts a digital signal into an analog signal in baseband. The mixer multiplies a baseband signal by a carrier to convert the baseband signal into a band-pass signal. The PA raises strength of the band-pass signal. The duplexer plays a role of a filter to distinguish an uplink signal from a downlink signal. The diplexer plays a role of a filter to distinguish (operating) bands different from each other. The RF reception chain includes a diplexer, a duplexer, an LNA (low noise amplifier), a mixer for frequency down converting, and an ADC (analog-to-digital converter). The LNA amplifies strength of a radio signal which is attenuated in the course of transmission. The mixer multiplies a band-pass signal by a carrier to covert the band-pass signal into a baseband signal. The ADC converts an analog signal into a digital signal in a baseband.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency down-coverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 210 or the base station 205 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of a message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. The multiple antenna technology is getting a spotlight as a next generation technology capable of overcoming restriction on mobile communication traffic.

Figure 3:
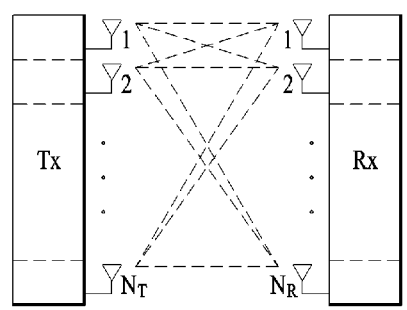
FIG. 3 is a diagram for a configuration of a general MIMO communication system.
Figure 3:
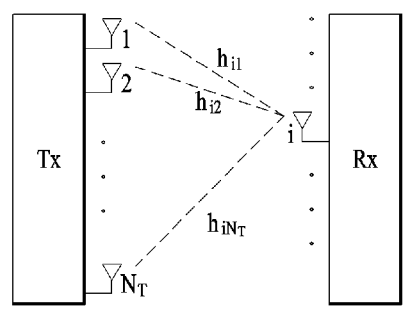

FIG. 3(a) shows the configuration of a wireless communication system including multiple antennas. As shown in FIG. 3(a), if the number of transmit (Tx) antennas and the number of Rx antennas are respectively increased to $N_T$ and $N_R$ at the same time, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 3]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 3 (a), it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 4.

$$s = [s_1, s_2, \ldots, s_{N_T}]^T \quad \text{[Equation 4]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 5.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 5]}$$

In Equation 5, $\hat{s}$ is a transmission vector, and can be represented by the following equation 6 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 6]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 7 using the vector X. Here, $W_{ij}$ denotes a weight between i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 7]}$$

$$W\hat{s} = WPs$$

Given $N_R$ Rx antennas, signals received at the respective Rx antennas, $y_1, y_2, \ldots, y_{N_R}$ may be represented as the following vector.

$$y = [y_1, y_2, \ldots y_{N_R}]^T \qquad \text{[Equation 8]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 9]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 10]}$$

Actual channels experience the above channel matrix H and then are added with

Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 11]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 12]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$ in the channel matrix H. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \qquad \text{[Equation 13]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 14 and equation 15, respectively. The equation 14 indicates a block code in case of 2 transmission antennas and the equation 15 indicates a block code in case of 4 transmission antennas.

$$\frac{1}{\sqrt{2}} \begin{pmatrix} S_1 & S_2 \\ -S_2^* & S_1^* \end{pmatrix} \qquad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \qquad \text{[Equation 15]}$$

In the equations 14 and 15, $S_i$ (i=1, 2, 3, 4) corresponds to a modulated data symbol. And, in the equations 14 and 15, a row of a matrix corresponds to an antenna port and a column of the matrix corresponds to time (STBC) or frequency (SFBC).

Figure 4:
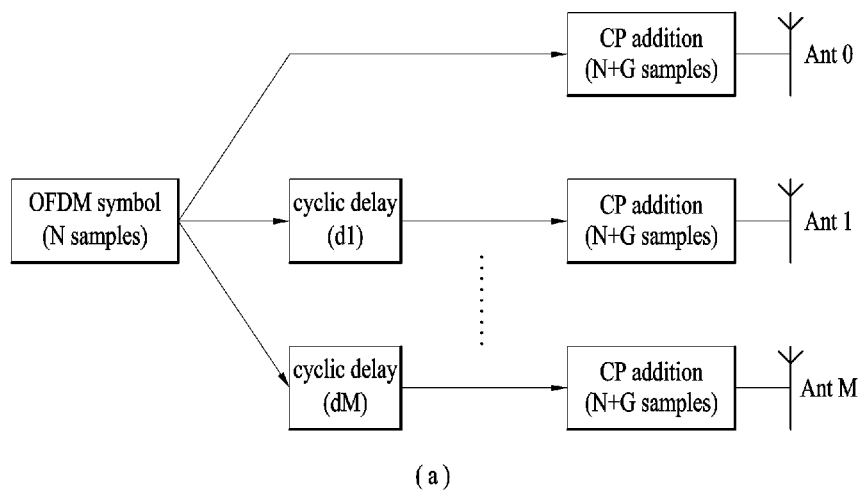
FIG. 4 is a diagram for an example of a general CDD structure in a MIMO system.
Figure 4:
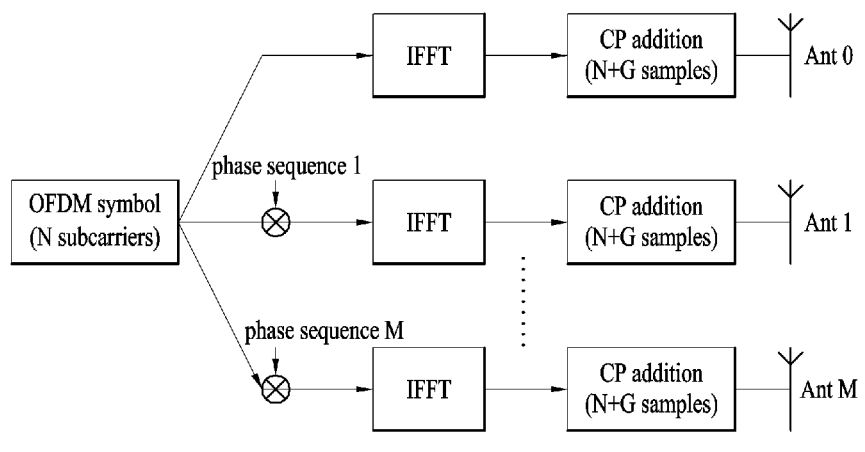

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4 (a) shows a scheme of applying cyclic delay in time domain. As shown in FIG. 4 (b), the CDD scheme applying the cyclic delay of FIG. 4 (a) can also be implemented by applying phase-shift diversity.

Codebook-Based Precoding Scheme

In order to support MIMO antenna transmission, it may be able to apply precoding configured to appropriately distribute transmission information to each of multiple antennas according to a channel status and the like. A codebook-based precoding scheme corresponds to a scheme that a transmitting end and a receiving end determine a set of precoding matrixes in advance, the receiving end (e.g., a UE) measures channel information from the transmitting end (e.g., a base station) and gives feedback on a most suitable precoding matrix (i.e., precoding matrix index (PMI)) to the transmitting end, and the transmitting end applies appropriate precoding to signal transmission based on the PMI.

Since the codebook-based precoding scheme is a scheme of selecting an appropriate precoding matrix from the pre-determined set of precoding matrixes, although an optimized precoding is not always applied, feedback overhead can be reduced compared to a case of explicitly giving feedback on optimized precoding information to actual channel information.

Figure 5:
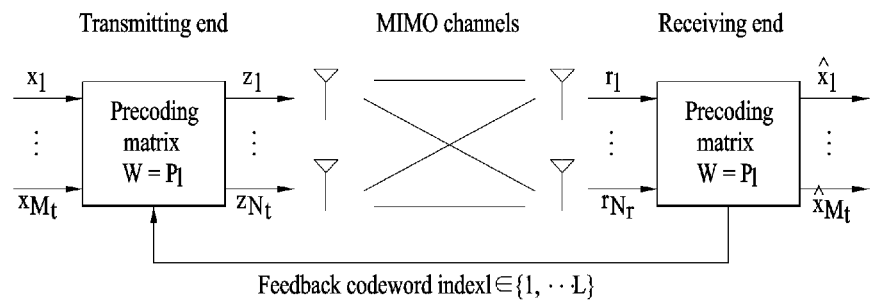
FIG. 5 is a diagram for explaining a basic concept of a codebook-based precoding.

FIG. 5 is a diagram for explaining a basic concept of a codebook-based precoding.

In case of following a codebook-based precoding scheme, a transmitting end and a receiving end share codebook information including the prescribed number of precoding matrixes, which are predetermined according to a transmission rank, the number of antennas, and the like. In particular, when feedback information is finite, the codebook-based precoding scheme can be used. The receiving end measures a channel state via a reception signal and may be then able to give feedback on information on the finite number of preferred precoding matrixes (i.e., an index of a corresponding precoding matrix) to the transmitting end based on the aforementioned codebook information. For instance, the receiving end measures a reception signal using ML (maximum likelihood) or MMSE (minimum mean square error) scheme and may be then able to select an optimized precoding matrix. Although FIG. 5 shows a case that the receiving end transmits precoding matrix information to the transmitting end according to a codeword, by which the present invention may be non-limited.

Having received the feedback information from the receiving end, the transmitting end can select a specific precoding matrix from a codebook based on the received information. The transmitting end, which has selected the precoding matrix, performs precoding in a manner of multiplying the number of layer signals corresponding to a transmission rank by the selected precoding matrix and may be then able to transmit a transmission signal on which the precoding is performed via a plurality of antennas. In a precoding matrix, the number of rows is identical to the number of antennas and the number of columns is identical to a rank value. Since the rank value is identical to the number of layers, the number of columns is identical to the number of layers. For instance, if the number of transmission antennas corresponds to 4 and the number of transmission layers corresponds to 2, a precoding matrix can be configured by a 4×2 matrix. Information transmitted via each layer can be mapped to each antenna through the precoding matrix.

Having received a signal, which is transmitted from the transmitting end in a manner of being pre-coded, the receiving end can restore the received signal in a manner of performing reverse processing on the precoding processed in the transmitting end. In general, since a precoding matrix satisfies a unitary matrix (U) condition such as $U^*U^H = I$, the reverse processing performed on the precoding can be performed using a scheme of multiplying Hermite matrix ($P^H$) of a precoding matrix (P) used in the precoding of the transmitting end by the received signal.

For instance, Table 1 in the following shows a codebook used for downlink transmission using 2 transmission antennas in 3GPP LTE release-8/9 and Table 2 in the following shows a codebook used for downlink transmission using 4 transmission antennas in 3GPP LTE release-8/9.

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers$^v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 2-continued

| Codebook index | $u_n$ | Number of layers 1 | 2 | 3 | 4 |
|---|---|---|---|---|---|
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained by a set $\{s\}$ configured from an equation represented as $W_n = I - 2u_n u_n^H/u_n^H u_n$. In this case, I indicates a 4×4 single matrix and $u_n$ is a value given in Table 2.

As shown in Table 1, in case of a codebook for 2 transmission antennas, it may have total 7 precoding vectors/matrixes. In this case, since a single matrix is used for an open-loop system, total 6 precoding vectors/matrixes are used for a close-loop system. And, in case of a codebook for 4 transmission antennas shown in Table 2, it may have total 64 precoding vectors/matrixes.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{\pm 1, \pm j, \pm \frac{(1+j)}{\sqrt{2}}, \pm \frac{(-1+j)}{\sqrt{2}}\right\}.$$

Feedback Channel Structure

Basically, since a base station is unable to know information on a downlink channel in FDD (frequency division duplex) system, the base station uses channel information fed back by a UE for downlink transmission. In case of a legacy 3GPP LTE release-8/9 system, a UE can feedback downlink channel information via PUCCH or PUSCH. In case of the PUCCH, the PUCCH periodically feedbacks channel information. In case of the PUSCH, the PUSCH aperiodically feedbacks channel information according to a request of the base station. And, channel information can be fed back in response to the whole of assigned frequency bands (i.e., wideband (WB)) or the specific number of RBs (i.e., subband (SB)).

Extended Antenna Configuration

Figure 6:
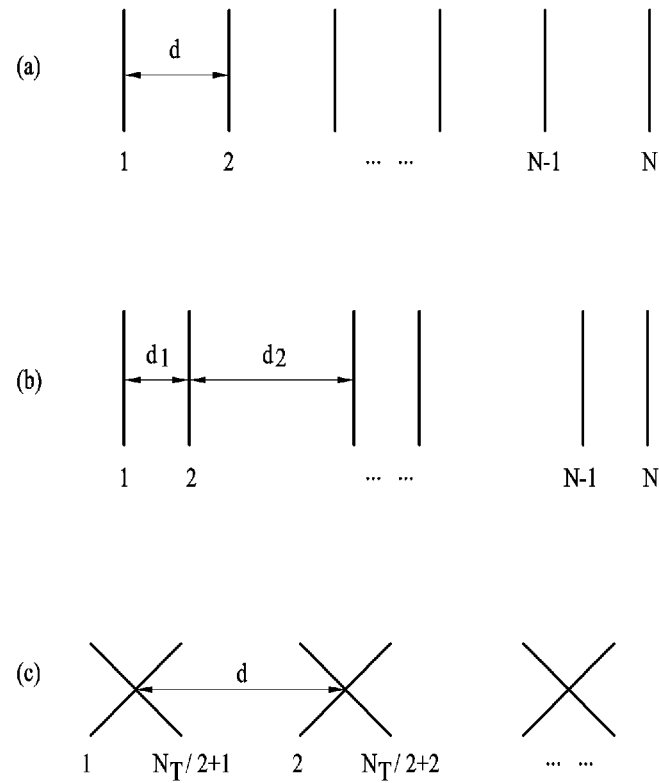
FIG. 6 is a diagram for examples of configuring 8 transmission antennas.

FIG. 6 is a diagram for examples of configuring 8 transmission antennas.

FIG. 6 (a) shows a case that N numbers of antennas configure an independent channel without grouping. In general, this case is referred to as an ULA (uniform linear array). If a plurality of antennas are deployed in a manner of being apart from each other, a space of a transmitter and/or a receiver may not be sufficient enough for configuring channels independent from each other.

FIG. 6 (b) shows an antenna configuration (paired ULA) of a ULA scheme that two antennas make a pair. In this case, an associated channel may exist between the two antennas making a pair and an independent channel may exist with an antenna of a different pair.

Meanwhile, unlike a legacy 3GPP LTE release-8/9 using 4 transmission antennas in downlink, 3GPP LTE release-10 system may use 8 transmission antennas in downlink. In order to apply the extended antennas configuration, it is necessary to install many antennas in an insufficient space. Hence, the ULA antenna configurations shown in FIGS. 6 (a) and (b) may not be appropriate for the extended configuration. Hence, as shown in FIG. 6 (c), it may consider applying a dual-pole (or cross-pole) antenna configuration. If transmission antennas are configured using the dual-pole (or cross-pole) antenna configuration, although a distance d between antennas is relatively short, it is able to transmit data of high throughput by lowering antenna correlation.

Codebook Structures

As mentioned in the foregoing description, if a predefined codebook is shared between a transmitting end and receiving end, it is able to reduce overhead of the receiving end resulted from making a feedback on precoding information to be used for MIMO transmission of the transmitting end. Hence, it is able to apply efficient precoding.

As an example of configuring a predetermined codebook, it may be able to configure a precoder matrix using a DFT (Discrete Fourier Transform) matrix or a Walsh matrix. Or, it may be able to configure a precoder of various forms in a manner of combining with a phase shift matrix or a phase shift diversity matrix.

In case of a co-polarization antenna system, a codebook of a DFT system shows good performance. In this case, when the DFT matrix-based codebook is configured, n×n DFT matrix can be defined as equation 16 in the following.

$$DFTn: D_n(k, \lambda) = \frac{1}{\sqrt{n}}\exp(-j2\pi k\lambda/n), \qquad [\text{Equation 16}]$$

$$k, \lambda = 0, 1, K\ldots, n-1$$

The DFT matrix shown in the equation 16 exists as a single matrix in response to a specific size n. Hence, in order to define various precoding matrixes and appropriately use the various precoding matrixes according to a situation, it may consider additionally configuring and using a rotated version of a DFTn matrix. Equation 17 in the following shows an example of a rotated DFTn matrix.

$$\text{rotated } DFTn: \qquad [\text{Equation 17}]$$

$$D_n^{(G,g)}(k, \lambda) = \frac{1}{\sqrt{n}}\exp(-j2\pi k(\lambda + g/G)/n),$$

$$k, \lambda = 0, 1, K\ldots, n-1, \quad g = 0, 1, K\ldots, G.$$

If a DFT matrix is configured using the equation 17, it may be able to generate G number of rotated DFTn matrixes and the generated matrixes satisfy a property of a DFT matrix.

In the following, a householder-based codebook structure is explained. The householder-based codebook structure corresponds to a codebook configured by a householder matrix. The householder matrix is a matrix used for householder transform. The householder transform is a sort of linear transformations and can be used for performing QR decomposition. The QR decomposition is to decompose a matrix into an orthogonal matrix (Q) and an upper triangular matrix (R). The upper triangular matrix corresponds to a square matrix that all components below a main diagonal line component are 0. An example of 4×4 householder matrix is shown in equation 18 in the following.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$ [Equation 18]

$$u_0^T = [1 \quad -1 \quad -1 \quad -1]$$

It may be able to generate 4×4 unitary matrix including a CM property by the householder transform. Similar to a codebook for 4 transmission antennas shown in Table 2, n×n precoding matrix can be generated using the householder transform and it may be able to configure the precoding matrix to be used for rank transmission less than n using a column subset of the generated precoding matrix.

Codebook for 8 Transmission Antennas

In 3GPP LTE release-10 system including an extended antenna configuration (e.g., 8 transmission antennas), it may be able to apply a feedback scheme previously used in a legacy 3GPP LTE release-8/9 system in a manner of extending the feedback scheme. For example, it may be able to feedback such channel state information (CSI) as an RI (rank indicator), a PMI (precoding matrix index), CQI (channel quality information) and the like. In the following, a method of designing a dual precoder-based feedback codebook capable of being used in a system supporting an extended antenna configuration is explained. In order to indicate a precoder to be used for MIMO transmission of a transmitting end in the dual precoder-based feedback codebook, a receiving end can transmit a precoding matrix index to the transmitting end. A precoding matrix can be indicated by a combination of two PMIs different from each other. In particular, if the receiving end feedbacks the two PMIs different from each other (i.e., a first PMI and a second PMI) to the transmitting end, the transmitting end determines a precoding matrix indicated by the first and the second PMI and may be then able to apply the determined precoding matrix to MIMO transmission.

In designing the dual precoder-based feedback codebook, it may consider MIMO transmission transmitted by 8 transmission antennas, whether or not single user-MIMO (SU-MIMO) and multiple user-MIMO (MU-MIMO) are supported, suitability of various antenna configurations, a reference of codebook design, a size of a codebook, and the like.

When a codebook is applied to MIMO transmission transmitted by 8 transmission antennas, if the codebook is greater than rank 2, SU-MIMO is supported only. If the codebook is equal to or less than the rank 2, it may consider designing a feedback codebook optimized to both the SU-MIMO and the MU-MIMO and the feedback codebook appropriate for various antenna configurations.

Regarding the MU-MIMO, it may be preferable to make UEs participating in the MU-MIMO to be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. And, in high scattering propagation environment (e.g., indoor environment including many reflected waves) capable of generating many spatial channels, a SU-MIMO operation may be more suitable as a MIMO transmission scheme. Hence, it may be able to configure a codebook for a rank greater than rank-2 to have good performance of identifying multiple layers.

When a precoder for MIMO transmission is designed, it may be preferable to make a precoder structure have good performance in response to various antenna configurations (low correlation, high correlation, cross-polarization, and the like). In case of arranging 8 transmission antennas, it may be able to configure a cross-polarization array including 4λ antenna space as a low-correlation antenna configuration, a ULA including 0.5λ antenna space as a high-correlation antenna configuration, or a cross-polarization array including 0.5λ antenna space as a cross-polarization antenna configuration. A DFT-based codebook structure can provide good performance in response to the high-correlation antenna configuration.

Meanwhile, block diagonal matrixes may be more suitable for the cross-polarization antenna configuration. Hence, if a diagonal matrix is introduced to a codebook for 8 transmission antennas, it is able to configure a codebook capable of providing goof performance to all antenna configurations.

As mentioned in the foregoing description, a reference of codebook design is to satisfy a unitary codebook, a CM property, a constrained alphabet property, an appropriate codebook size, a nested property and the like. The reference is applied to 3GPP LTE release-8/9 codebook design. It may consider applying the reference of codebook design to 3GPP LTE release-10 codebook design supporting an extended antenna configuration as well.

In relation to a size of a codebook, in order to sufficiently support a merit of using 8 transmission antennas, it is necessary to increase the size of the codebook. In order to obtain a sufficient precoding gain from the 8 transmission antennas in low correlation environment, a codebook (e.g., a codebook of a size greater than 4 bits in response to a rank 1 and a rank 2) of a big size may be required. A codebook of a size of 4 bits may be sufficient in obtaining a precoding gain in high correlation environment. Yet, in order to achieve a multiplexing gain of the MU-MIMO, it may be able to increase a codebook size for the rank 1 and the rank 2.

Based on the aforementioned contents, the present invention proposes a method transmitting a reference signal in a wireless communication system. In particular, the present invention is effective when a transmitting end uses a 3D MIMO system utilizing 2D-array antenna that a horizontal antenna and a vertical antenna are installed together. As a representative embodiment, the present invention can be utilized for downlink communication between a base station and a user equipment in a cellular network.

In a system appearing after LTE Rel-12, using an antenna system utilizing AAS is considered. It is expected that the AAS is able to actively control overall antenna beam pattern by changing a beam pattern of each antenna compared to a previous passive antenna system. Since the control of the antenna beam pattern is able to reduce interference or increase a channel gain, thereby increasing overall system performance. If the AAS is constructed in 2 dimensions (2D-AAS), it is able to more efficiently (in 3D) control a main lobe of an antenna in the aspect of an antenna pattern and it is able to more actively change a transmission beam according to a location of a receiver.

Figure 7:
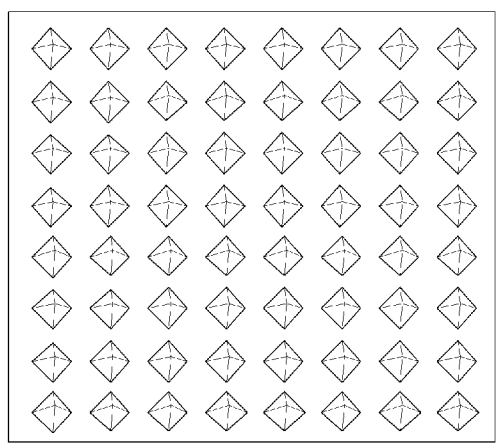
FIG. 7 is a diagram for an active antenna system (AAS)

FIG. 7 shows an example of the aforementioned 2D-AAS. As shown in FIG. 7, the 2D-AAS installs antennas in vertical and horizontal directions to install a system of a plurality of antennas.

Figure 8:
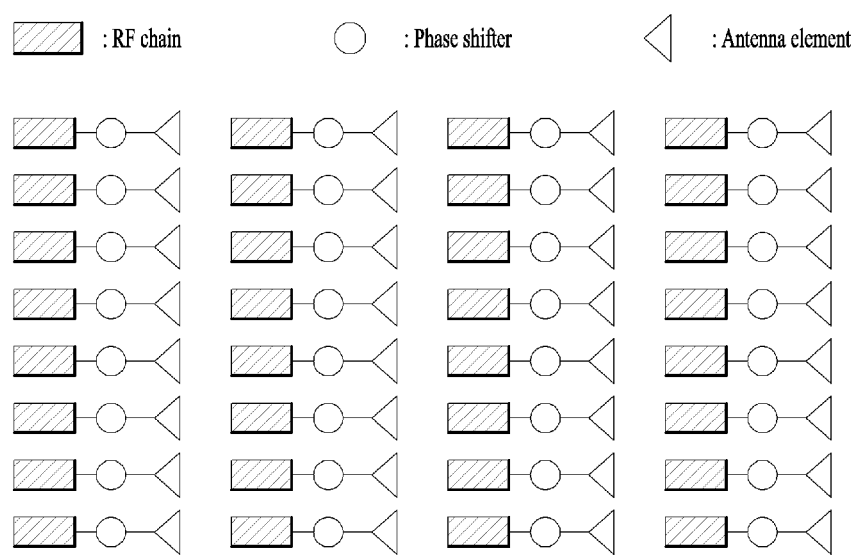
FIGS. 8 and 9 are diagrams for structures of an antenna element and a radio frequency chain to perform beamforming for 2D-AAS in a legacy system.

Moreover, in order to perform beamforming for the 2D-AAS, as shown in FIG. 8, it is preferable to configure a single radio frequency (RF) chain per antenna element. FIG. 8 shows a case that 32 antennas in total are configured by installing 4 antenna elements in horizontal direction and installing 8 antenna elements in vertical direction.

However, when multiple antenna elements are installed in a communication system, if RF chains as many as the number of the multiple antenna elements are installed, a cost issue may occur. In consideration of the cost issue, as shown in FIG. 9, many communication systems connect a plurality of antenna elements to a single RF chain using a phase shifter to make a baseband signal passed through the RF chain to be precoded by the phase shifter.

Figure 9:
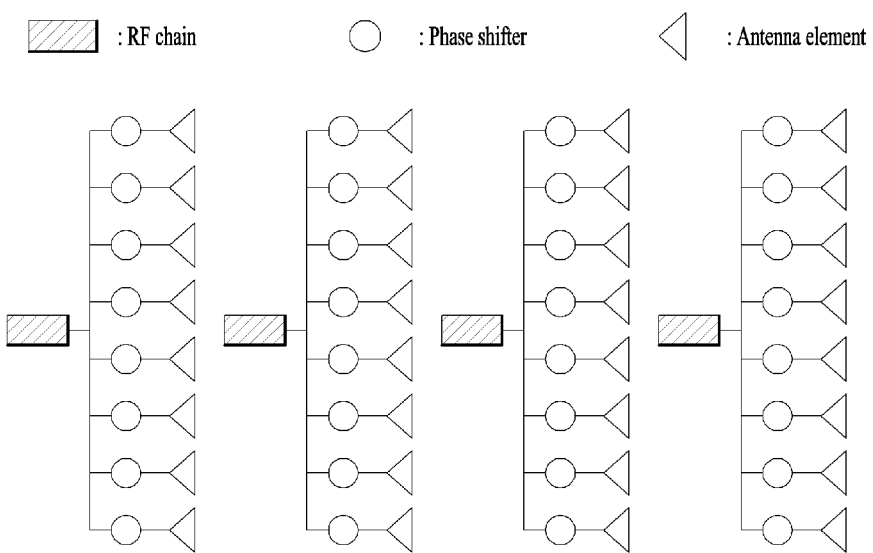

FIG. 9 is explained in more detail. Referring to FIG. 9, the number of antenna elements is 32 in total in a manner that 4 antenna elements are configured in horizontal direction and 8 antenna elements are configured in vertical direction. 8 antenna elements in each vertical direction are connected with a single RF chain through a phase shifter.

Hence, in FIG. 9, antenna beam control in horizontal direction can be precoded by an RF chain and antenna beam control in vertical direction can be precoded by a phase shifter. The antenna beam control in horizontal direction can be performed through an RF chain in every different frequency resource at the same time. In other word, it may be able to generate 4 horizontal beam directions in every different frequency resource at the same time.

Yet, the antenna beam control in vertical direction is not the same. Assume that 4 beams in vertical direction are generated through a phase shifter in a random frequency resource at a certain time. In this case, it is difficult to generate a beam rather than the 4 beams in vertical direction in a different frequency resource at the same time.

In other word, when 8 antenna elements in vertical direction connected with each RF chain are precoded by a phase shifter, the precoding is applied to all frequency resources at the same time.

Although vertical precoding, which is generated by a phase shifter at the same time, is identically applied to the whole frequency, it may be able to generate a new vertical precoding in a different time resource through the phase shifter. Hence, a part to which restrictive precoding is applied in a beam is mainly considered as a frequency domain.

In LTE system, as a representative signal for downlink, there are 3 types of signals including a CSI-RS, a DM-RS, and a CRS and channels including PDCCH corresponding to a control channel and PDSCH on which data is transmitted. The CSI-RS is used for the usage of channel estimation by a UE to calculate CSI and the DM-RS is used for estimating a channel by a UE to demodulate data. A UE uses the CRS to calculate CSI or estimate a channel for data demodulation. The UE uses the CRS to measure RSRP (received signal received power). The RSs, the PDCCH, and the PDSCH are transmitted through a port of 3 types. The CSI-RS is transmitted through a CSI-RS port. The DRMS is transmitted through a DMRS port. The CRS and the PDCCH are transmitted through a CRS port. The PDSCH is transmitted through a CRS port or a DMRS port according to a transmission mode.

A location at which each of the RSs, the PDCCH, and the PDSCH is transmitted is differently classified in a frequency resource and a time resource. Yet, in the aspect of the same time resource, there exists a case that a plurality of RSs are transmitted together. Assume that a base station including the antenna system shown in FIG. 9 transmits data on PDSCH while transmitting a DMRS using 4-port DMRS. In this case, assume that a CSI-RS is transmitted to a different frequency resource in a time resource in which the 4-port DMRS and the PDSCH are transmitted. Yet, as mentioned in the foregoing description, it is difficult to apply a beam direction rather than a beam in vertical direction applied to the 4-port DMRS to the CSI-RS. Since a beam direction applied to DMRS corresponds to specific beams for a specific UE, a vertical direction of specific directions is applied. Hence, it is very difficult to generate a beam in vertical direction commonly used in the CSI-RS.

Method 1

In order to more freely control a passively generated beam in the 3D-MIMO scenario, the present invention proposes to install RF chains different from each other according to a CSI-RS port, a DMRS port, and a CRS port corresponding to 3 RS ports mainly used for downlink transmission in accordance with a method 1-A or a method 1-B described in the following.

Method 1-A:

While RF chains for a CSI-RS port, a DMRS port, and a CRS port are installed, a different RF chain is installed according to each RS type (CSI-RS, DMRS, and CRS). Each RF chain is connected with one or more antenna elements through a phase shifter.

Figure 10:
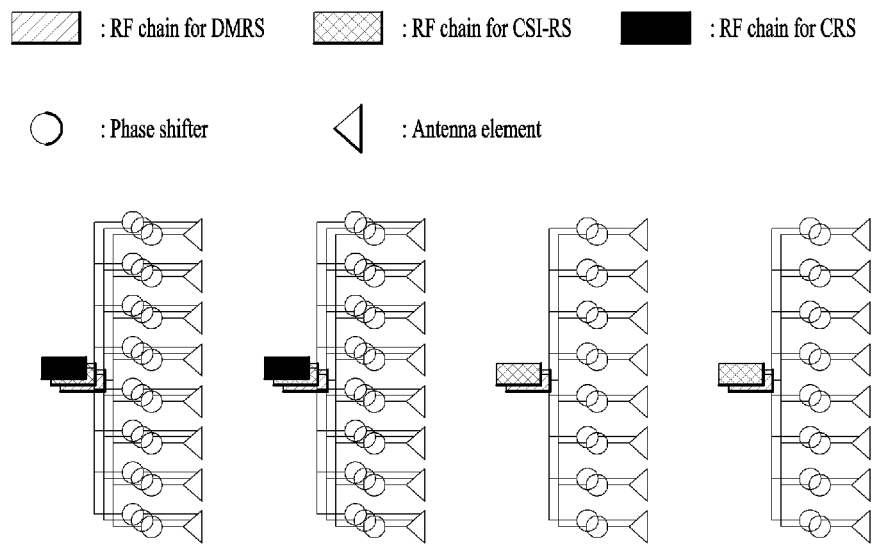
FIGS. 10 and 11 are diagrams for structures of an antenna element and a radio frequency chain to perform beamforming for 2D-AAS according to the present invention.

The method 1-A is explained in detail with reference to FIG. 10 in the following. Referring to FIG. 10, there are 32 antenna elements in total in a manner that 4 antenna elements are configured in horizontal direction and 8 antenna elements are configured in vertical direction. Each RF chain is connected with the 8 antenna elements in vertical direction through 8 phase shifters.

In FIG. 10, the number of RF chains corresponds to 10. In this case, 4 RF chains are used for a DMRS port, another 4 RF chains are used for a CSI-RS port, and the remaining 2 RF chains are used for a CRS port. Yet, if it is assumed that a power amplifier is attached to every RF chain, it is necessary to increase capacity of a power amplifier attached to an RF chain for a CRS port when the CRS port is configured by 2 RF chains. Hence, the RF chain for the CRS port can also be managed by the number of RF chains identical to the number of RF chains for the DMRS port and the CSI-RS port.

Method 1-B:

Yet, in case of an RS port managed in a current LTE system, a CRS port and a CSI-RS port are transmitted from a different time resource in most case. (Since PDSCH transmitted through a CRS port in a partial transmission mode can be transmitted from a time resource in which a CSI-RS is transmitted, method 1-B can be restrictively managed compared to the method 1-A.)

Hence, although the same RF chain is used for the CRS port and the CSI-RS port, restriction on a beam is trivial. Based on this, it may be able to modify and use the method 1-A. When RF chains are installed for a CSI-RS port, a DMRS port, and a CS port, the RF chains for the DMRS port differ from the RF chains for the CSI-RS port. On the contrary, the RF chains for the CSI-RS port can also be used for the CRS port.

Figure 11:
Figure 11:
Figure 11:
Figure 11:
Figure 11:
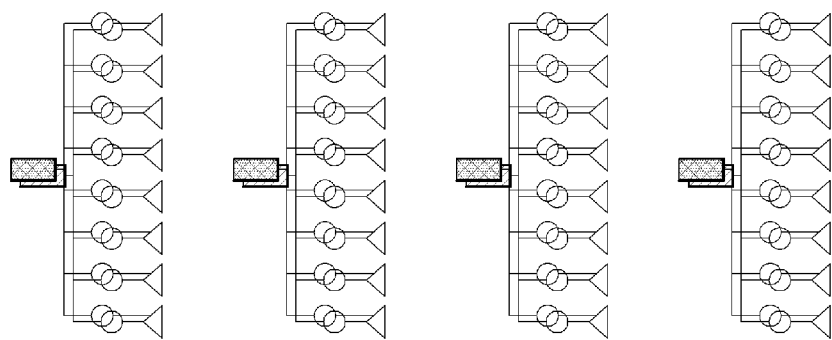

Each RF chain is connected with one or more antenna elements through a phase shifter. The method 1-B is explained with reference to FIG. 11. Referring to FIG. 11, there are 64 antenna elements in total in a manner that 4 antenna elements are configured in horizontal direction and 8 antenna elements are configured in vertical direction. And, each RF chain is connected with the 8 antenna elements in vertical direction through 8 phase shifters. In FIG. 11, the number of RF chains corresponds to 8. In this case, 4 RF chains are used for the DMRS port and another 4 RF chains are used for the CSI-RS port and the CRS port.

Method 2

In the following, a method of configuring a CSI-RS in a system having RF chains less than the total number of antenna elements and a CSI-RS design are described.

First of all, a CSI-RS currently used in LTE is explained. Currently, a modulated symbol of a CSI-RS is determined by equation 19 described in the following.

$$a_{k,l}^{(p)} = w_{l''} \cdot r_{l,n_s}(m') \quad \text{[Equation 19]}$$

In equation 19, $r_{l,n_s}(m)$ becomes an RS sequence value of an $m^{th}$ resource block (RB) in an $l^{th}$ OFDM symbol in an $n_S$ slot and $w_{l''}$ becomes a value of 1 or −1 for performing CDM in a sequence value. And, $a_{k,l}^{(p)}$ may correspond to a modulated symbol in a resource element (RE) having a position of an $l^{th}$ OFDM symbol at $k^{th}$ frequency position at a $p^{th}$ port. In this case, resource mapping of a CSI-RS can be determined by equations 19 and 20 described in the following.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{[Equation 20]}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the equation 20, $N_{RB}^{maxDL}$ corresponds to a maximum bandwidth capable of being possessed by a system and $N_{RB}^{DL}$ corresponds to a bandwidth of a current system. In the equation 20, values (k',l') for resource mapping and a slot condition related to the values are shown in Tables 3 and 4. Table 3 corresponds to a table for a normal CP and Table 4 corresponds to a table for an extended CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |

TABLE 4-continued

| CSI refer- | Number of CSI reference signals configured | | | | | |
|---|---|---|---|---|---|---|
| | 1 or 2 | | 4 | | 8 | |
| ence signal configuration | (k', l') | $n_s$ mod 2 | (k', l') | $n_s$ mod 2 | (k', l') | $n_s$ mod 2 |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

A CSI-RS mapping characteristic in a normal CP is explained in the following. 2-port CSI-RS is positioned at 2 REs over 2 adjacent OFDM symbols per PRB pair and the 2 REs are located at the same frequency resource. 4-port CSI-RS is positioned at 4 REs over 2 adjacent OFDM symbols per PRB pair and each of the 2 REs is located at the same frequency resource. 8-port CSI-RS is positioned at 8 REs over 2 adjacent OFDM symbols per PRB pair and each of the 2 REs is located at the same frequency resource. This can be schematized via FIG. 12.

Figure 12:
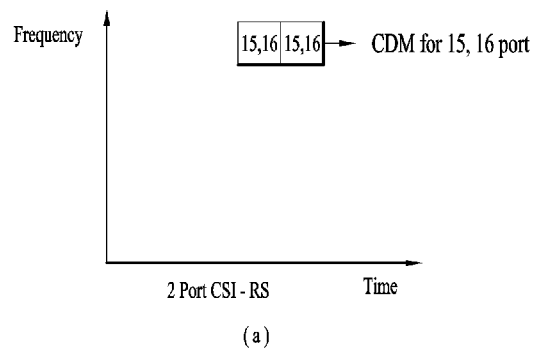
FIG. 12 is a diagram for CSI-RS mapping in LTE system.
Figure 12:
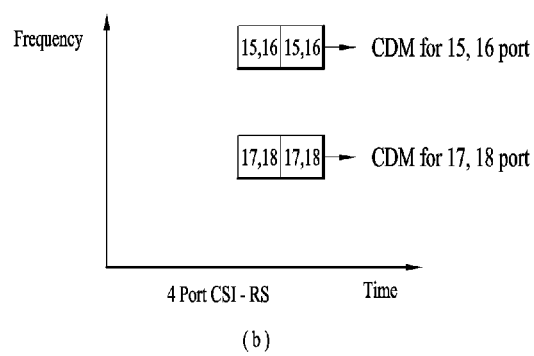
Figure 12:
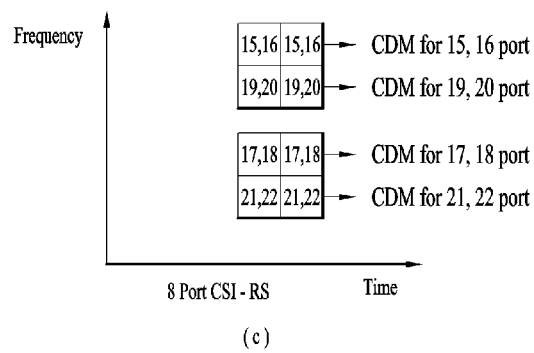

Referring to FIG. 12, all CSI-RS structures are located over 2 adjacent OFDM symbols and frequency resources are located at the same position by two. In case of two symbols located at the same frequency resource of two adjacent OFDM symbols, CDM is applied to the two symbols as [1 1] and [1 −1].

As mentioned in the foregoing description, when the total number of antenna elements is smaller than the total number of RF chains, there exists a limit in generating a different beam in a different frequency resource at the same time.

However, according to a CSI-RS structure of current LTE, it may have a situation that a half of beams are shown only due to a CDM structure.

For example, assume that a base station has an antenna system shown in FIG. 11. In this case, the base station can generate 4 beams at a time using an RF chain for a CSI-RS for beams in vertical direction. In this case, if the base station intends to show 8 different beams to UEs via 8-port CSI-RS to know the beam in vertical direction, current LTE system is unable to do it. This is because, as shown in FIG. 12, since the 8-port CSI-RS is located at 4 REs per one OFDM symbol but CDM is applied to an adjacent OFDM symbol, it is necessary to generate 8 beams per one symbol.

In order to solve a problem that it is unable to freely transmit a beam in a CSI-RS to which FDM, TDM, and CDM are applied at the same time, the present invention proposes to indicate that FDM and TDM are applied only and CDM is not applied when the CSI-RS is configured. Or, if the indication does not exist, it may follow a specific CSI-RS configuration that applies FDM and TDM only without CDM.

While using the CSI-RS resource mapping of the current LTE system (equation 19, equation 20, Table 3-1, and Table 3-2), CSI-RS configuration may indicate whether or not CDM is used by 1 bit. (A specific CSI-RS configuration may follow a configuration of applying FDM and TDM all the time while not applying CDM without the 1-bit indication.)

Method 2-A:

When a CSI-RS is configured, if it is indicated that FDM and TDM are applied only without applying CDM, a base station transmits a CSI-RS under an assumption that $$w_{l''} = \begin{cases} 1 & p \in \{15, 17, 19, 21\} \\ (-1)^{l''} & p \in \{16, 18, 20, 22\} \end{cases}$$

$$l'' = 0, 1$$

of equation 20 is modified into equation 21 in the following. A UE can perform channel estimation using the CSI-RS through the modified equation 21.

$$w_{l''} = 1 \quad \text{[Equation 21]}$$

$$l'' = \begin{cases} 0 & p \in \{15, 17, 19, 21\} \\ 1 & p \in \{16, 18, 20, 22\} \end{cases}$$

Figure 13:
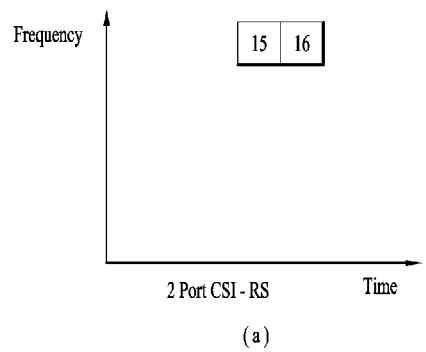
FIG. 13 is a diagram for a case of performing mapping by modifying CSI-RS according to the present invention.
Figure 13:
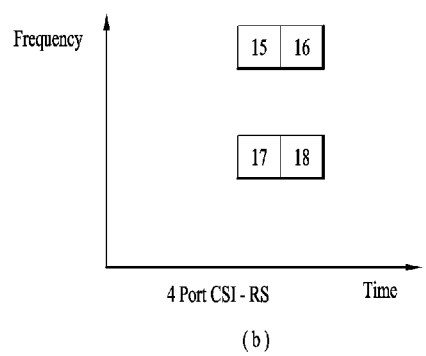
Figure 13:
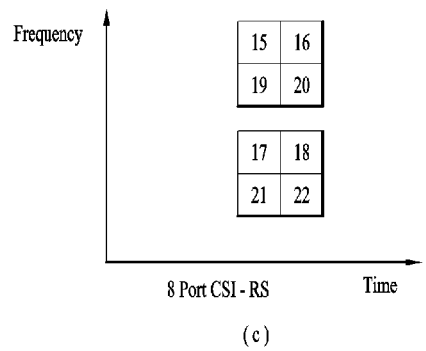

FIG. 13 is a diagram for a case of performing transmission/mapping by modifying a CSI-RS according to the method 2-A of the present invention.

Method 2-B:

Alternately, as a different method, when N-port CSI-RS resource mapping is performed, the present invention proposes to map a CSI-RS over 4 OFDM symbols instead of 2 OFDM symbols.

According to a current LTE system (equation 19, equation 20, Table A, and Table 4) CSI-RS resource mapping, 2 CSI-RSs having the same port number and are mapped to a different OFDM symbol are bound. And, when a port of each of the CSI-RSs is represented as {15-1, 16-1, 17-1, 18-1, 19-1, 20-1, 21-1, 22-1} and {15-2, 16-2, 17-2, 18-2, 19-2, 20-2, 21-2, 22-2} (in this case, 15-1 corresponds to a first CSI-RS mapped to a port 15 and 15-2 corresponds to a second CSI-RS mapped to the port 15), {15-1, 16-1, 17-1, 18-1} and {19-2, 20-2, 21-2, 22-2} ports are maintained as it is, but {19-1, 20-1, 21-1, 22-1} and {15-2, 16-2, 17-2, 18-2} ports are exchanged with each other by 1:1. (For example, 21-1 is exchanged with 17-2 and 17-2 is exchanged with 21-1).

In this case, when two CSI-RSs mapped to a different OFDM symbol are bound, a base station and a UE can promise the two CSI-RSs to be bound in advance. When a CSI-RS is configured, it may indicate whether to apply the method 2-B using 1 bit.

Method 3

As a further different method of the present invention, according to a current LTE system (equation 19, equation 20, Table 3, and Table 4) CSI-RS resource mapping, $N_2$ number of 2-port CSI-RSs, which are mapped to a different OFDM symbol, are bound to make $2N_2$-port CSI-RSs. When a CSI-RS is configured, it may indicate whether to apply the method 3 using 1 bit.

In the present invention, the aforementioned methods 2 and 3 can be used in a manner of being combined with each other.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Although the method of transmitting a reference signal in a multi-antenna wireless communication system and an apparatus therefor are described centering on examples applied to 3GPP LTE system, it may be applicable to various wireless communication systems as well as to the 3GPP LTE system.

What is claimed is:

1. A base station in a wireless communication system supporting multiple antennas, the base station comprising:
    a transceiver comprising multiple antenna elements, and multiple radio frequency (RF) chains; and
    a processor configured to control the transceiver,
    wherein the multiple antennas elements comprise a plurality of horizontal antenna elements placed in a horizontal domain and a plurality of vertical antenna elements placed in a vertical domain,
    wherein the multiple RF chains comprise one or more first RF chains and one or more second RF chains,
    wherein each of the one or more first RF chains and the one or more second RF chains are connected with each of the plurality of vertical antenna elements,
    wherein the one or more first RF chains are configured to be only used for a demodulation reference signal (DMRS) port,
    wherein the one or more second RF chains are configured to be commonly used for a channel state information-reference signal (CSI-RS) port and a cell-specific reference signal (CRS) port,
    wherein the one or more first RF chains are connected to a plurality of first phase shifters respectively corresponding to each of the plurality of vertical antenna elements, and the one or more second RF chains are connected to a plurality of second phase shifters respectively corresponding to each of the plurality of vertical antenna elements, and
    wherein each of the first phase shifters and the second phase shifters controls a vertical beam by precoding the plurality of vertical antenna elements at the same time resources,
    when a number of the one or more second RF chains is larger than or equal to a number of the multiple antenna elements, numbers of CSI-RS port mapped to a subframe shows a pattern as shown in a table below:

|  | first symbol | second symbol |
|---|---|---|
| 1st subcarrier | 15, 16 | 15, 16 |
| 2nd subcarrier | 19, 20 | 19, 20 |
| 3rd subcarrier | 17, 18 | 17, 18 |
| 4th subcarrier | 21, 22 | 21, 22 | when the number of the one or more second RF chains is smaller than the number of the multiple antenna elements, the numbers of the CSI-RS port mapped to the subframe shows a pattern as shown in a table below:

|  | first symbol | second symbol |
|---|---|---|
| 1st subcarrier | 15 | 16 |
| 2nd subcarrier | 19 | 20 |
| 3rd subcarrier | 17 | 18 |
| 4th subcarrier | 21 | 22 | wherein the first symbol and the second symbol are consecutive symbols in the subframe, wherein the first symbol and the second symbol are applied code division multiplexing (CDM) when the number of the one or more second RF chains is larger than or equal to the number of the multiple antenna elements, and wherein the first symbol and the second symbol are not applied CDM when the number of the one or more second RF chains is smaller than the number of the multiple antenna elements.

* * * * *